(12) United States Patent
Hong

(10) Patent No.: US 7,662,504 B2
(45) Date of Patent: Feb. 16, 2010

(54) DIRECT OXIDATION FUEL CELL

(75) Inventor: Ming-Zi Hong, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/605,051

(22) Filed: Nov. 27, 2006

(65) Prior Publication Data

US 2007/0122682 A1 May 31, 2007

(30) Foreign Application Priority Data

Nov. 29, 2005 (KR) .................. 10-2005-0114771

(51) Int. Cl.
*H01M 8/02* (2006.01)
*H01M 8/10* (2006.01)
*H01M 8/24* (2006.01)

(52) U.S. Cl. .............................. 429/38; 429/32; 429/39

(58) Field of Classification Search .................. 429/38, 429/32, 39
See application file for complete search history.

(56) References Cited

U.S. PATENT DOCUMENTS

| | | | |
|---|---|---|---|
| 2003/0039876 A1 | 2/2003 | Knights et al. | |
| 2004/0001988 A1* | 1/2004 | Yazici et al. | 429/34 |
| 2005/0227140 A1* | 10/2005 | Beckmann et al. | 429/44 |
| 2007/0072052 A1* | 3/2007 | An et al. | 429/38 |

FOREIGN PATENT DOCUMENTS

| | | |
|---|---|---|
| CN | 1666362 A | 9/2005 |
| CN | 1689176 A | 10/2005 |
| KR | 2002-0057083 | 7/2002 |
| WO | WO 02/41421 A1 * | 5/2002 |
| WO | WO 2004/031497 A2 * | 4/2004 |
| WO | WO 2004/038824 A2 | 5/2004 |
| WO | WO 2004/042855 A2 * | 5/2004 |

* cited by examiner

*Primary Examiner*—Patrick Ryan
*Assistant Examiner*—Angela J. Martin
(74) *Attorney, Agent, or Firm*—Christie, Parker & Hale, LLP

(57) ABSTRACT

A direct oxidation fuel cell is provided. A direct oxidation fuel cell includes one or more electricity generators which have a membrane-electrode assembly and anode and cathode members disposed in close contact with respective sides of the membrane-electrode assembly interposed therebetween to generate electrical energy and water by a reaction of a fuel and oxygen. The cathode member includes a plurality of air vents through which air flows and is exposed to the atmosphere. Diameters of a plurality of the air vents gradually increase in a direction toward an exposed area of the cathode member.

14 Claims, 8 Drawing Sheets

DIRECT OXIDATION FUEL CELL

CROSS-REFERENCE TO RELATED APPLICATION

This application claims priority to and the benefit of Korean Patent Application No. 10-2005-0114771 filed in the Korean Intellectual Property Office on Nov. 29, 2005, the entire content of which is incorporated herein by reference.

BACKGROUND OF THE INVENTION

1. Field of the Invention

The present invention relates to a direct oxidation fuel cell.

2. Description of the Related Art

The direct oxidation fuel cell is directly supplied with a fuel in liquid phase and generates electrical energy by an electrochemical reaction of hydrogen contained in the fuel and air supplied separately.

The direct oxidation fuel cell may be of the passive type in which air is supplied at no-load independent of a pump or a blower, or an active type in which air is supplied by driving a pump or a blower.

The passive type direct oxidation fuel cell includes a membrane-electrode assembly (MEA) and anode and cathode plates disposed in close contact with respective sides of the MEA interposed therebetween.

The cathode plate includes a plurality of air vents through which air flows and is exposed to the atmosphere. The air vents have the same diameter and penetrate the cathode plate, and the diameter is of such a size that conductivity of the cathode plate can be sustained. In other words, the cathode plate is disposed in close contact with the MEA while maintaining a reference contact area such that a contact area closely contacting the MEA does not affect the conductivity.

However, the conventional passive type direct oxidation fuel cell generates water vapor through a reduction reaction of air in the MEA, and the cathode plate is exposed to the atmosphere, so that the water vapor contacts the atmosphere of a relatively low temperature and is condensed into water in the air vents of the cathode plate. The condensed water is collected in the air vents of the cathode plate, so that the condensed water blocks the air vents by operation of surface tension.

Accordingly, in the conventional direct oxidation fuel cell, the air vents of the cathode plate are blocked by the condensed water so as not to be properly supplied with air in the atmosphere. Therefore, efficiency and reliability of the entire fuel cell decreases.

In order to solve the aforementioned problem, the conventional direct oxidation fuel cell is constructed such that diameters of the entire air vents of the cathode plate increase. In this case, the contact area of the cathode plate with respect to the MEA becomes smaller than the reference contact area, so that electrons cannot properly move to the cathode plate.

Consequently, in the conventional direct oxidation fuel cell, the potential difference that occurs when electrons move decreases. Accordingly, the output efficiency of electrical energy decreases.

SUMMARY OF THE INVENTION

In accordance with embodiments of the present invention a direct oxidation fuel cell is provided in which conductivity of a cathode plate can be sustained, and simultaneously, water condensed in air vents of the cathode plate can be easily discharged.

According to an aspect of the present invention, a direct oxidation fuel cell is provided that includes one or more electricity generators which have an MEA and anode and cathode members disposed in close contact with respective sides of the MEA interposed therebetween to generate electrical energy and water by a reaction of a fuel and oxygen. The cathode member includes a plurality of air vents through which air flows and is exposed to the atmosphere.

Diameters of the plurality of air vents may gradually increase in a direction toward an exposed area of the cathode member.

The exposed area of the cathode member exposed to the atmosphere may be larger than a contact area of a contacting surface of the cathode member closely contacting the MEA.

The air vent may include a first portion which is formed at a contacting surface of the cathode member closely contacting the MEA and has a predetermined diameter and a second portion which is extended from the first portion and has a diameter that gradually increases in a direction toward an exposed area of the cathode member.

The air vents may be formed in a tapered shape.

The cathode member may include water discharge lines which are formed as grooves for connecting the air vents at an exposed area exposed to the atmosphere in order to discharge water condensed in the air vents.

The water discharge lines may include branch lines connected to the air vents and joining lines connected to the branch lines.

The air vents may include first portions which have predetermined diameters and are formed at a contacting surface of the cathode member closely contacting the MEA and second portions which are extended from the first portions and have diameters that gradually increase in a direction toward the exposed area of the cathode member. The water discharge lines may be formed as grooves to connect the second portions with others of the second portions. The water discharge lines may include branch lines connected to the second portions and joining lines connected to the branch lines.

The anode member may include a flowpath through which the fuel flows, and the flowpath may be formed in a meandering shape.

The anode and cathode members may be constructed as current collectors for collecting currents having the opposite polarity to each other.

According to another aspect of the present invention, the cathode member may include both a plurality of air vents through which air in the atmosphere flows and water discharge lines which are formed at an exposed area exposed to the atmosphere so as to discharge water condensed in the air vents.

When the cathode member includes both a plurality of air vents and water discharge lines the exposed area of cathode member exposed to the atmosphere may be the same as a contacting area of a contacting surface of the cathode member closely contacting the MEA.

The water discharge lines may be formed as grooves along the gravity direction and connect the air vents with others of the air vents.

DETAILED DESCRIPTION

Figure 1:
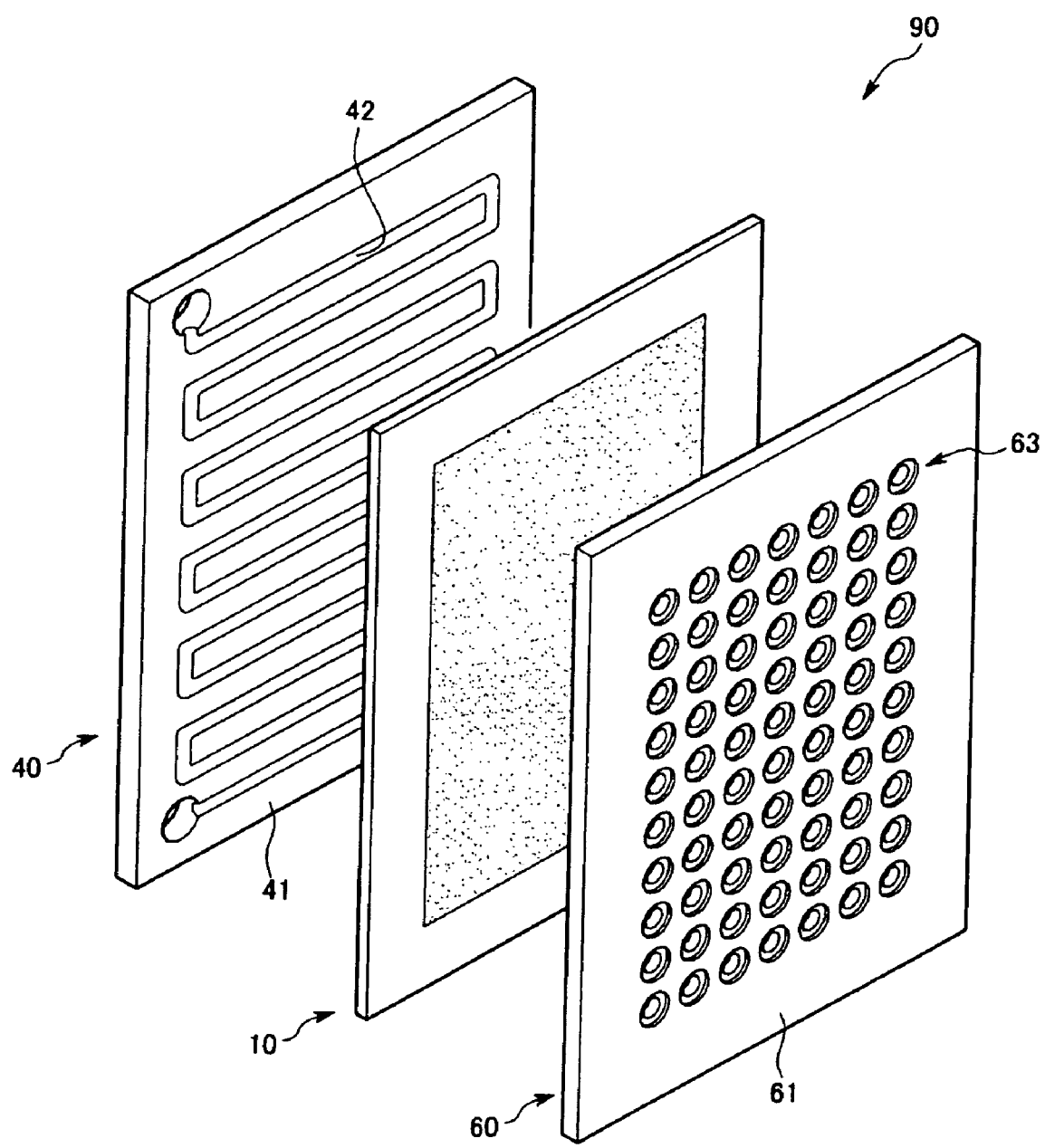
FIG. 1 is an exploded perspective view showing a structure of a direct oxidation fuel cell according to a first embodiment of the present invention.
Figure 2:
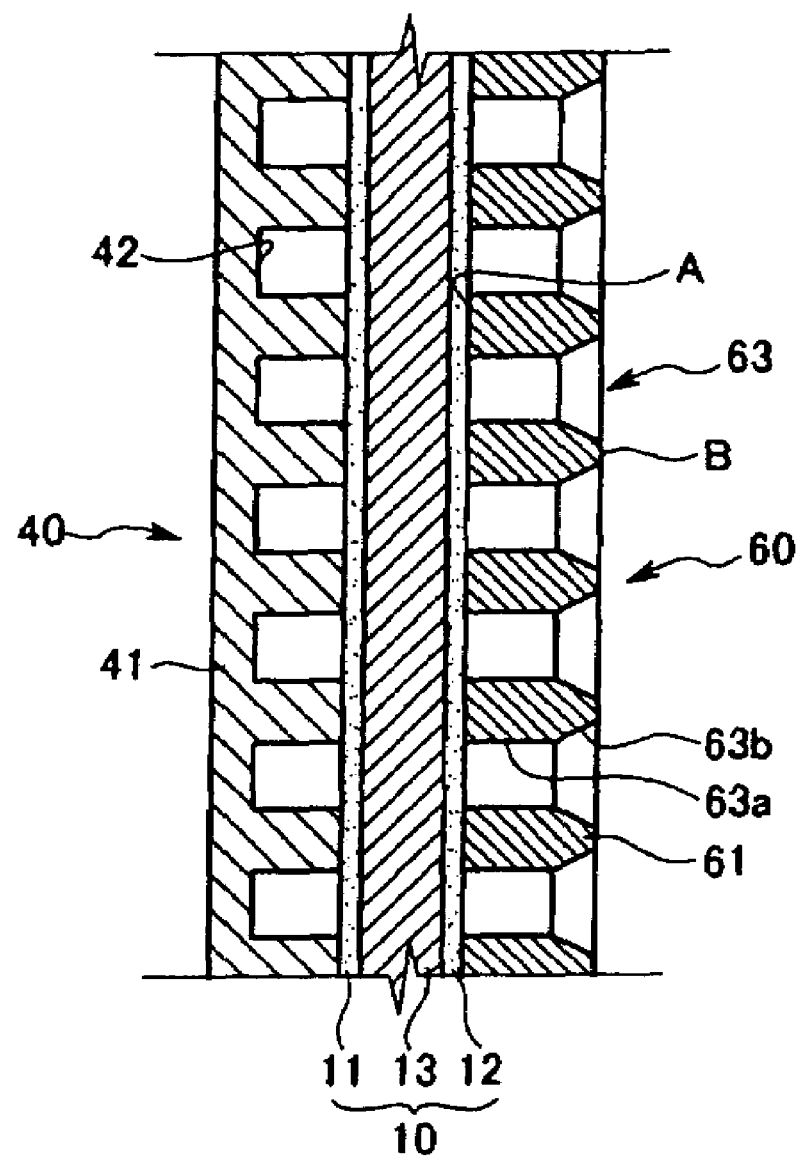
FIG. 2 is a cross sectional view showing an assembled structure of FIG. 1.

Referring to FIGS. 1 and 2, a direct oxidation fuel cell 100 is an electricity generating system for generating electrical energy by an electro-chemical reaction of a fuel and oxygen and outputting the electrical energy to a predetermined electronic device.

The direct oxidation fuel cell 100 may be a direct methanol fuel cell (DMFC) employing a conventional passive type in which an alcohol-based fuel such as methanol and ethanol and air in the atmosphere are directly supplied to generate electrical energy by an oxidation reaction of hydrogen contained in the fuel and a reduction reaction of oxygen contained in the air.

More specifically, the direct oxidation fuel cell 100 according to the present embodiment includes one or more electricity generating units 90 which are supplied with a fuel by a fuel supply device (not shown) or by a capillary action of a fuel or a density difference and air in the atmosphere by diffusion and convection, and generate electrical energy by oxidation and reduction reactions of the fuel and the air, respectively.

The direct oxidation fuel cell 100 according to the embodiment may be a plate type fuel cell in which the electricity generating units 90 are disposed in a plane. In the figure, the fuel cell 100 according to the embodiment has a single electricity generating unit 90. This is because the figure is simplified for the convenience of description. Alternatively, a plurality of the electricity generating units 90 may be sequentially disposed to constitute the fuel cell 100 according to the present embodiment.

The electricity generating unit 90 of the direct oxidation fuel cell 100 as described above basically includes an MEA 10 and anode and cathode members 40, 60 disposed in close contact with respective sides of the MEA 10 interposed therebetween.

Referring to FIG. 2, a first electrode layer 11 is formed at the one side of the MEA 10, a second electrode layer 12 is formed at the other side thereof, and a membrane 13 is formed between the two electrode layers 11, 12. The anode member 40 is disposed in close contact with the first electrode layer 11, and the cathode member 60 is disposed in close contact with the second electrode layer 12.

The first electrode layer 11 is supplied with a fuel through the anode portion 40. In addition, in the first electrode layer 11, hydrogen contained in the fuel is decomposed into electrons and hydrogen ions by an oxidation reaction. In the membrane 13, the hydrogen ions decomposed from the hydrogen in the first electrode layer 11 move to the second electrode layer 12. In the second electrode layer 12, the electrons and the hydrogen ions received from the first electrode layer 11 are reacted with oxygen supplied through the cathode member 60 to generate water and heat.

In the embodiment, the anode member 40 is made of a conductive metal in a shape of a plate to be closely contacted with the first electrode layer 11 of the MEA 10. In the anode member 40, the fuel is distributed to be supplied to the first electrode layer 11 of the MEA 10. In addition, the anode member 40 serves as a conductor such that the electrons decomposed from the hydrogen in the first electrode layer 11 move to the cathode member 60 that will be further described later.

The anode member 40 is provided with a flowpath 42 through which the fuel flows to the first electrode layer 11. The flowpath 42 is formed at a surface corresponding to the first electrode layer 11 of the MEA 10 in a shape of a channel. The flowpath 42 is formed in generally straight lines at predetermined intervals at the one area of the anode portion 40 facing the first electrode layer 11 of the MEA 10, and both ends of the lines are connected in alternate position, so that the flowpath 42 is formed in a meandering shape.

In addition, as described above, the anode member 40 serves as a conductor in which electrons move to the cathode member 60. Therefore, the anode member 40 may be constructed as a current collector 41 for collecting currents having the opposite polarity to that of the cathode portion 60.

In the present embodiment, the cathode member 60 is exposed to the atmosphere and is made of a conductive metal in a shape of a plate to be closely contacted with the second electrode layer 12 of the MEA 10. Air in the atmosphere is distributed to be supplied to the second electrode layer 12 of the MEA 10 through the cathode member 60 by diffusion and convection. In addition, the cathode member 60 serves as a conductor so as to receive electrons from the anode member 40.

In order to supply the air in the atmosphere to the second electrode layer 12 of the MEA 10, the cathode member 60 is provided with a plurality of air vents 63 penetrating the plate of the cathode member 60 at a side corresponding to the second electrode layer 12 of the MEA 10.

In addition, the cathode member 60 serves as a conductor for receiving electrons from the anode member 40 as described above, so that the cathode member 60 may be constructed as a current collector 61 for collecting currents having the opposite polarity to that of the anode member 40.

When the direct oxidation fuel cell 100 according to the present embodiment having the aforementioned construction operates, water vapor is generated by a reduction reaction of oxygen in the second electrode layer 12 of the MEA 10. Since the cathode member 60 is exposed to the atmosphere, the water vapor contacts the atmosphere of a relatively low temperature and is condensed into water in the air vents 63 of the cathode member 60.

In the direct oxidation fuel cell 10, the cathode member 60 is constructed in which diameters of the air vents 63 increase in a direction from a contact area (A) (hereinafter, denoted by a "first surface" for the convenience) closely contacting the MEA 10 to an exposed area (B) (hereinafter, denoted by a "second surface" for the convenience) exposed to the atmosphere.

Therefore, the condensed water like water drops at the air vents 63 can be easily discharged, so that air in the atmosphere can be properly supplied to the second electrode layer 12 of the MEA 10. More specifically, when the condensed water is collected in the air vents 63 of the cathode member 60, the condensed water blocks the air vents 63 by operation of surface tension. In this case, air in the atmosphere cannot be sufficiently supplied to the second electrode layer 12 of the MEA 10 through the air vents 63. In order to prevent this situation, the aforementioned construction of the cathode member 60 is used.

Figure 3:
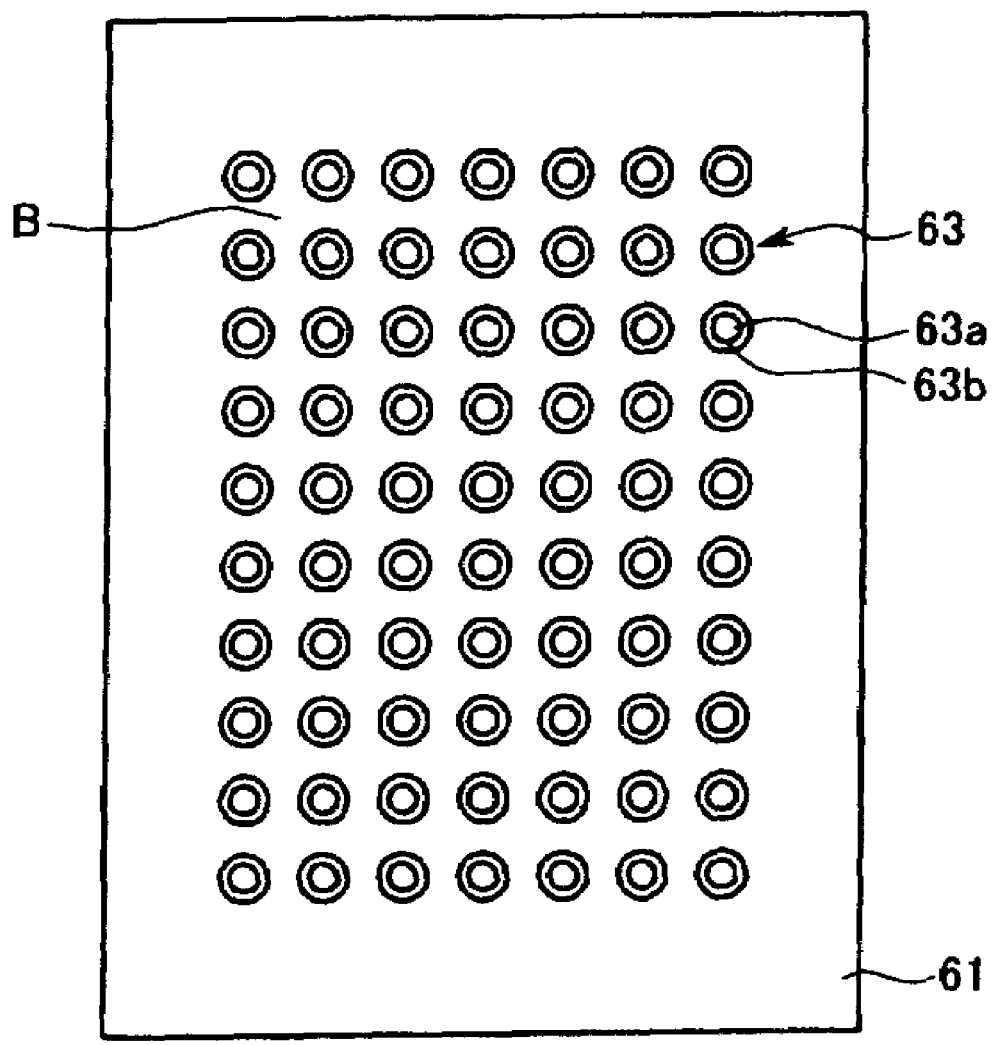
FIG. 3 is a plan view showing a cathode member shown in FIG. 1.

In the present embodiment, as shown in FIGS. 2 and 3, the air vent 63 of the cathode member 60 includes a first portion 63a of a predetermined diameter formed at the first surface (A) of the cathode member 60 closely contacting the second electrode layer 12 of the MEA 10 and a second portion 63b which is extended from the first portion 63a and has a diameter that gradually increases in a direction toward the second surface (B) of the cathode member 60 exposed at the atmosphere. In other words, the contact area of the first surface (A) of the cathode member 60 is larger than the exposed area of the second surface (B) thereof.

More specifically, in the cathode member 60, the first portion 63a of the air vent 63 has an opening portion of a predetermined diameter formed at the first surface (A) of the cathode member 60, and is formed to a predetermined depth with the same diameter toward the second surface (B). On the other hand, the second portion 63b is extended from the first portion 63a, has a diameter that gradually increases in a direction toward the second surface (B) of the cathode member 60, and forms an opening portion having a larger diameter than the first portion 63a at the second surface (B) of the cathode member 60.

Therefore, due to the first portions 63a of the air vents 63 having the conventional diameters, the cathode member 60 has a contact area in the first surface (A) similar to that of the conventional cathode member. The first surface (A) is disposed in close contact with the second electrode layer 12 of the MEA 10. Since the diameter of the second portion 63b of the air vent 63 in the cathode member 60 gradually increases in a direction from the first portion 63a to the second surface (B), the surface tension of water condensed at the second portion 63b decreases, and the water can be easily discharged outside the air vents 63. Accordingly, in the embodiment, the air vents 63 of the cathode member 60 are prevented from being blocked, so that air at the atmosphere can be properly supplied to the second electrode layer 12 of the MEA 10 through the air vents 63.

The operation of the direct oxidation fuel cell 100 having the aforementioned construction according to the embodiment of the present invention will now be described in more detail.

First, a fuel flows along the flow path 42 of the anode member 40 and is supplied to the first electrode layer 11 of the MEA 10. Thereafter, in the first electrode layer 11 of the MEA 10, hydrogen contained in the fuel is decomposed into electrons and hydrogen ions (protons) by an oxidation reaction of the fuel. The hydrogen ions move to the second electrode layer 12 through the membrane 13 of the MEA 10, and the electrons are unable to pass the membrane 13 and move to the cathode member 60 through the anode member 40.

By means of the aforementioned operation, the direct oxidation fuel cell 100 according to the present embodiment generates currents by movements of the electrons, and the anode and cathode members 40, 60 are constructed as the current collectors 41, 61 for collecting currents, thereby outputting electrical energy having a predetermined potential difference.

At the same time, air in the atmosphere flows through the air vents 63 of the cathode member 60 by diffusion and convection and is supplied to the second electrode layer 12 of the MEA 10. Thereafter, in the second electrode layer 12 of the MEA 10, hydrogen ions passing through the membrane 13, electrons passing through the anode member 40, and the air supplied through the air vents 63 are reacted to generate heat and water.

Since the air vent 63 of the cathode member 60 is provided with a first portion 63a which has a predetermined diameter and is formed at the first surface (A) and a second portion 63b having a diameter that gradually increases in a direction toward the second surface (B), the surface tension of water condensed at the second portion 63b decreases. Therefore, the water can be easily discharged outside the air vents 63. Accordingly, the direct oxidation fuel cell 100 according to the present embodiment can prevent the air vents 63 of the cathode member 60 from being blocked by the water. Therefore, air in the atmosphere can be properly supplied to the second electrode layer 12 of the MEA 10 through the air vents 63 of the cathode member 60.

Particularly, due to the first portions 63a of the air vents 63, the cathode member 60 has the contact area in the first surface (A) similar to that of the conventional cathode member. The first surface (A) is disposed in close contact with the second electrode layer 12 of the MEA 10. Therefore, conductivity for connecting the first and second electrode layers 11, 12 in series can be sustained, and water condensed in the air vents 63 can be easily discharged by the aforementioned operation.

Figure 4:
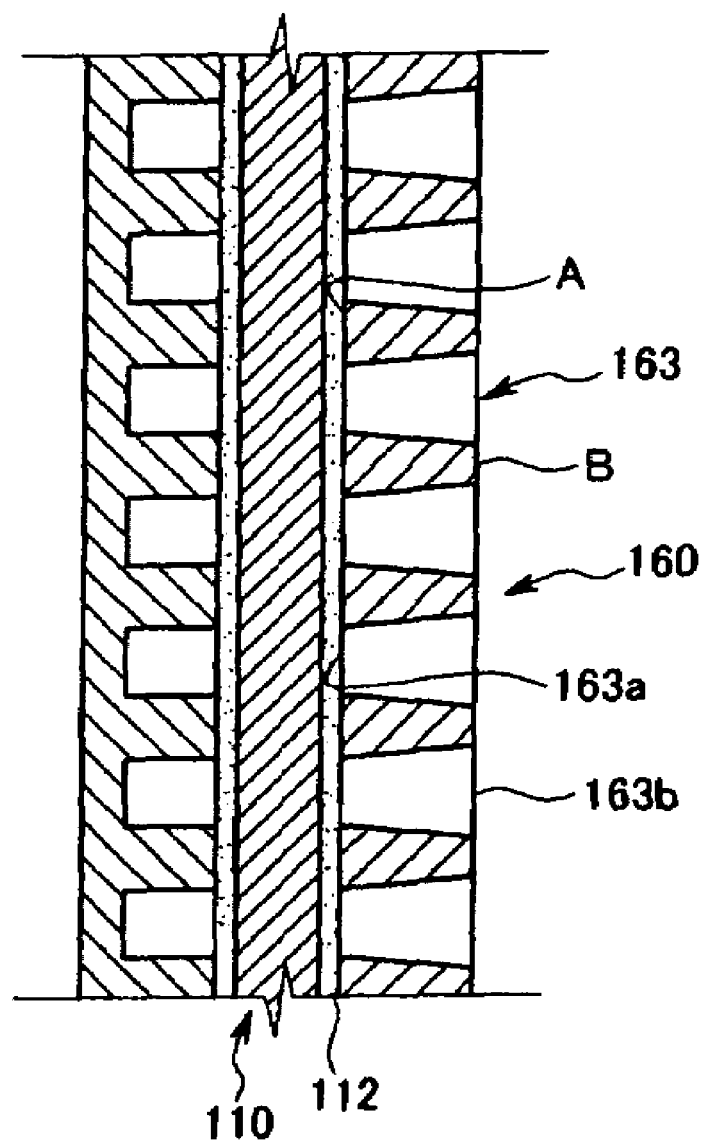
FIG. 4 is a cross sectional view showing a structure of a direct oxidation fuel cell according to a second embodiment of the present invention.

FIG. 4 is a cross sectional view showing a structure of a direct oxidation fuel cell according to a second embodiment of the present invention.

Referring to FIG. 4, a direct oxidation fuel cell 200 according to the present embodiment includes a cathode member 160 having air vents 163 which have diameters gradually increase in a direction from a first surface (A) to a second surface (B) and are formed in a tapered shape.

More specifically, the air vent 163 of the cathode member 160 is provided with a first opening portion 163a having a predetermined diameter at the first surface (A) and a second opening portion 163b having a relatively larger diameter than that of the first opening portion 163a at the second surface (B). The first and second opening portions 163a, 163b are connected so as to be formed in a tapered shape.

Therefore, due to the first opening portions 163a of the air vents 163, the cathode member 160 according to the embodiment has a contact area in the first surface (A) similar to that of the conventional cathode member. The first surface (A) is disposed in close contact with the second electrode layer 112 of the MEA 110. Since the air vent 163 of the cathode member 160 is formed in a tapered shape in which the diameter of the air vent 163 gradually increases in a direction from the first surface (A) to the second surface (B), the surface tension of water condensed at the second opening portion 163b decreases, and the water can be easily discharged outside the air vent 163.

Since other components and operations of the direct oxidation fuel cell 200 according to the embodiment are same as those of the fuel cell in the aforementioned embodiment, a detailed description thereof is omitted.

Figure 5:
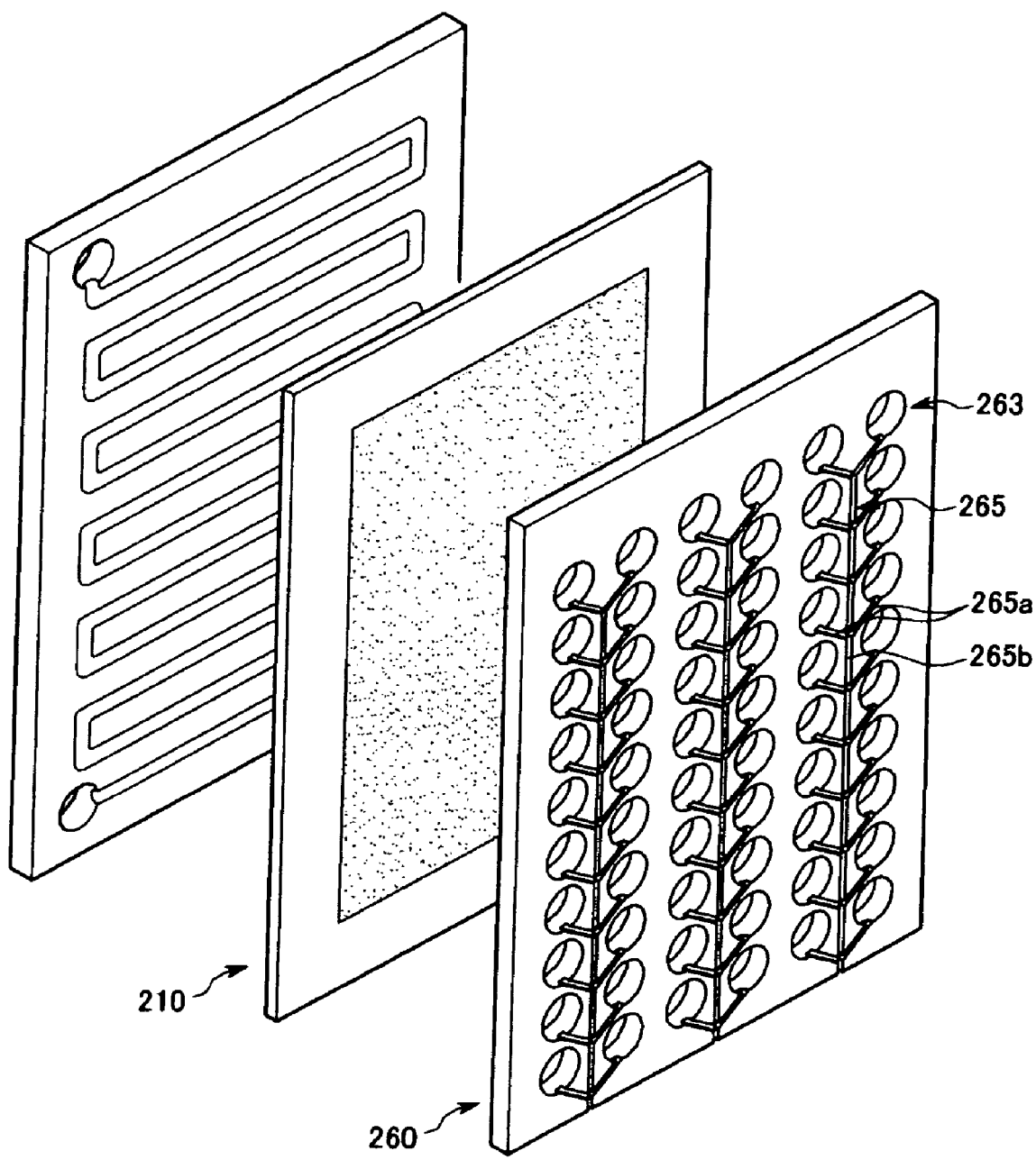
FIG. 5 is an exploded perspective view showing a structure of a direct oxidation fuel cell according to a third embodiment of the present invention.
Figure 6:
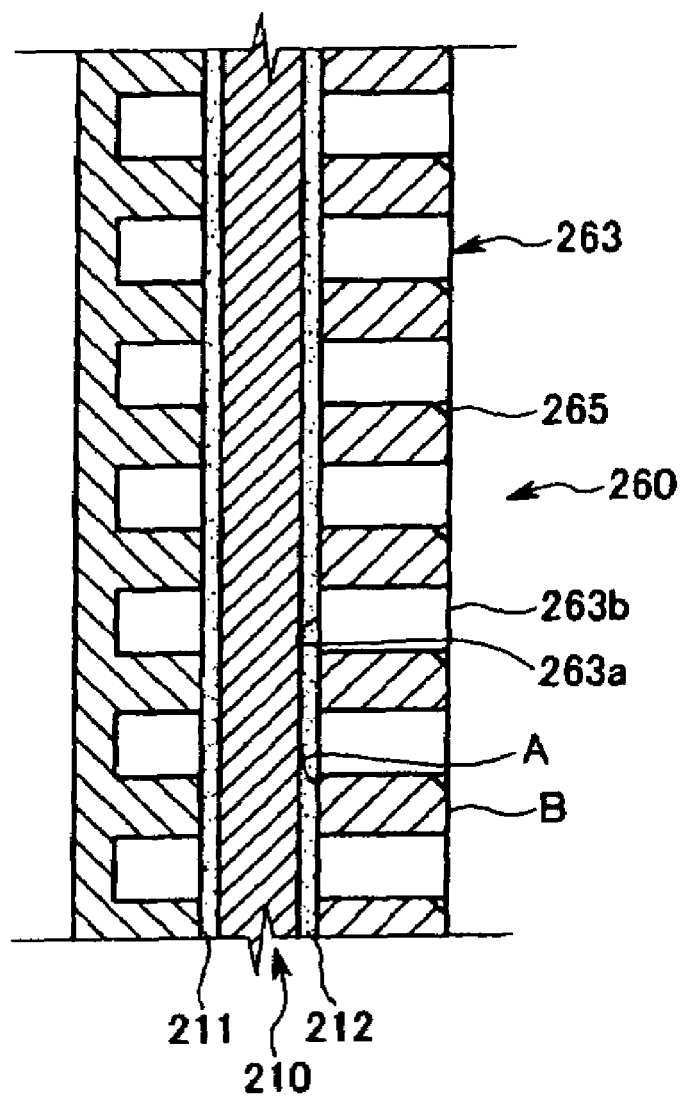
FIG. 6 is a cross sectional view showing an assembled structure of FIG. 5.
Figure 7:
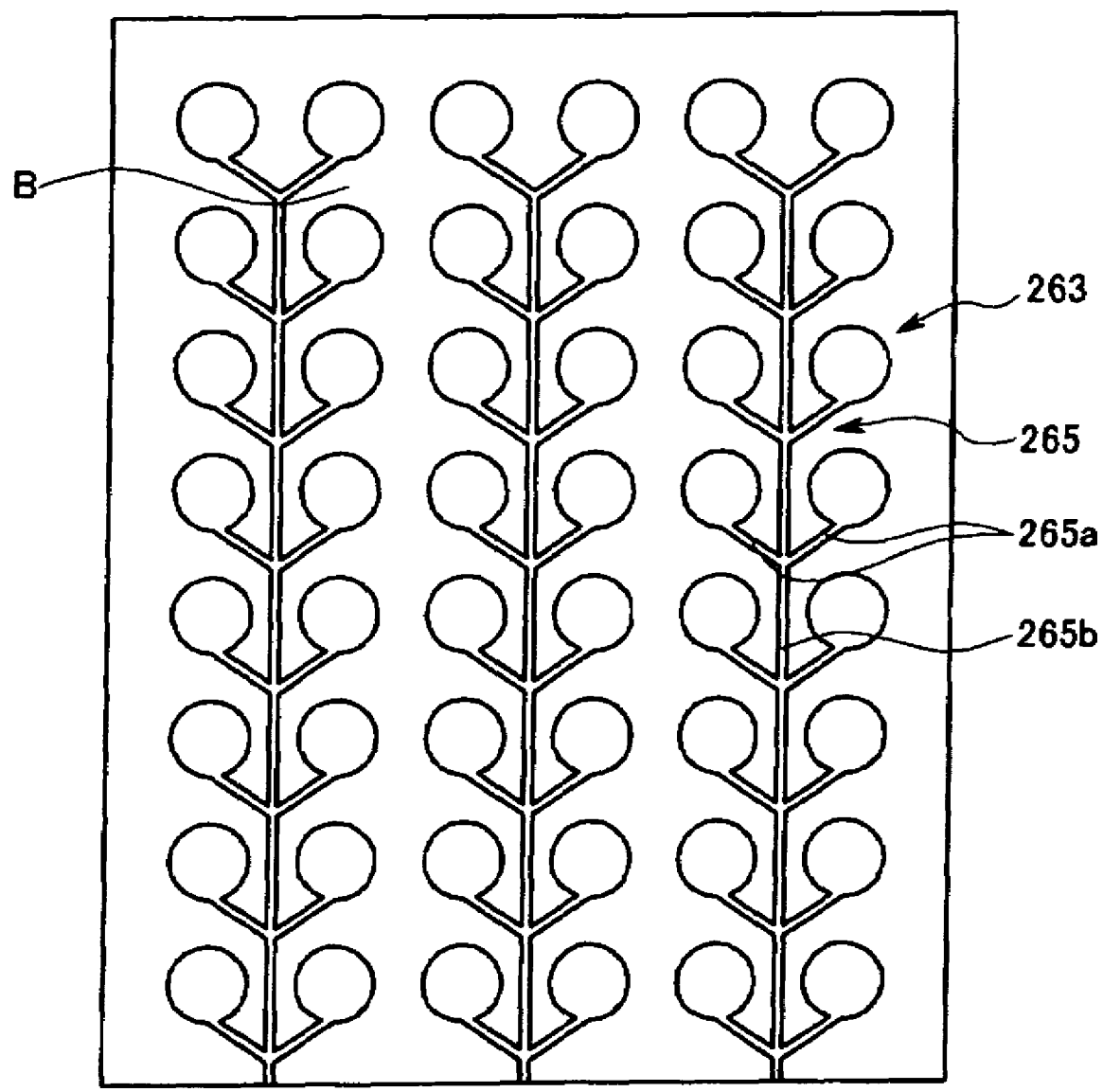
FIG. 7 is a plan view showing a cathode member shown in FIG. 5.

FIG. 5 is an exploded perspective view showing the structure of a direct oxidation fuel cell according to a third embodiment of the present invention. FIG. 6 is a cross sectional view showing an assembled structure of FIG. 5. FIG. 7 is a plan view showing a cathode member shown in FIG. 5.

Referring to FIGS. 5, 6, and 7, a direct oxidation fuel cell 300 according to the present embodiment includes conventional air vents 263 and a cathode member 260 including water discharge lines 265 connected to the air vents 263.

The air vent 263 is formed in a direction from a first surface (A) to a second surface (B) with the same diameter similarly to the conventional air vents. That is, the cathode member 260 is constructed in that a contact area of the first surface (A) contacting the second electrode layer 212 of the MEA 210 is the same as an exposed area of the second surface (B) exposed to the atmosphere.

More specifically, the air vent 263 includes a first opening portion 263a having a predetermined diameter at the first surface (A) of the cathode member 260 and a second opening portion 263b having the same diameter as that of the first opening portion 263a at the second surface (B) thereof, and the first and second opening portions 263a, 263b are connected.

In the embodiment, the water discharge lines 265 are formed at the second surface (B) of the cathode member 260. The water discharge lines 265 serve as flowpaths for connecting the second portions 263b of the air vents 263 and through which water condensed at the second opening portion 263b can be easily discharged.

More specifically, as shown in FIGS. 5 and 7, the water discharge lines 265 are formed as grooves which connect the second opening portions 263b of the air vents 263 with each other at the second surface (B) of the cathode member 260 and are formed in the gravity direction on the basis that the cathode member 260 stands erect.

The water discharge lines 265 include branch lines 265a which branch off from the second opening portions 263b of the air vents 263 and are formed to be inclined downwardly, and joining lines 265b which are formed in the vertical direction (the gravity direction) of the cathode member 260 and are connected with the branch lines 265a.

Therefore, due to the first opening portions 263a of the air vents 263, the cathode member 260 has a contact area in the first surface (A) similar to that of the conventional cathode member. The first surface (A) is disposed in close contact with the second electrode layer 212 of the MEA 210. In addition, the cathode member 260 includes the water discharge lines 265 which connect the second opening portions 263b of the air vents 263 with each other at the second surface (B). Therefore, conductivity for connecting the first and second electrode layers 211, 212 in series can be sustained, and the water can be easily discharged outside the air vents 263 through the water discharge lines 265.

Since other components and operations of the direct oxidation fuel cell 300 according to the embodiment are same as those in the aforementioned embodiments, a detailed description thereof is omitted.

Figure 8:
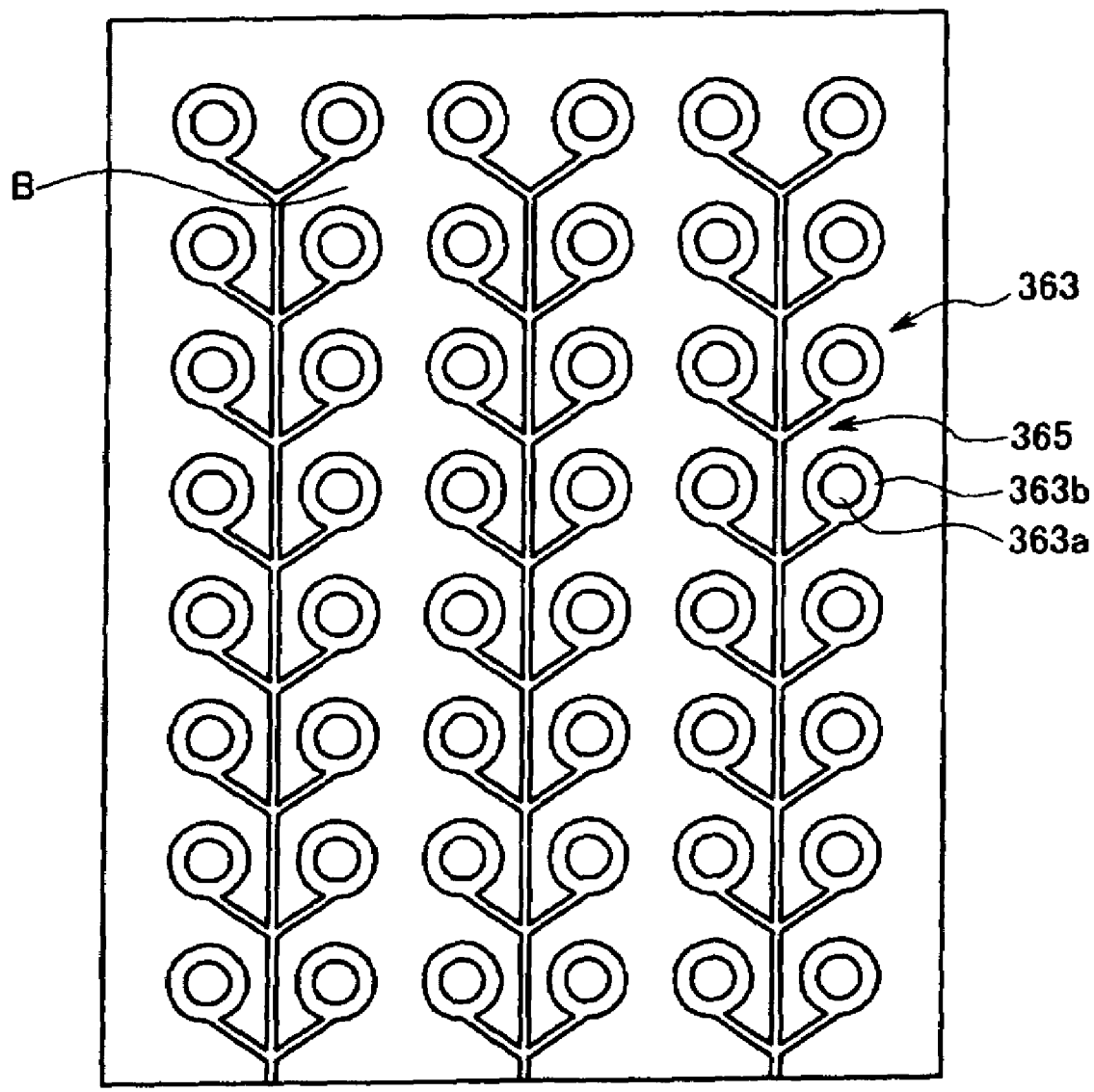
FIG. 8 is a plan view showing a cathode member of a direct oxidation fuel cell according to a fourth embodiment of the present invention.

FIG. 8 is a plan view showing a cathode member of a direct oxidation fuel cell according to a fourth embodiment of the present invention.

Referring to FIG. 8, in the present embodiment, the cathode member 360 of the direct oxidation fuel cell 300 includes the air vents 363 as described in the first embodiment and water discharge lines 365 connected to the air vents 363.

The air vents 363 have the same structure as that in the first embodiment, so that a detailed description thereof is omitted.

In the present embodiment, the water discharge lines 365 are formed as grooves which connect the second portions 363b of the air vents 363 at a second surface (B) of the cathode member 360. Since other components of the discharge lines 365 are same as those in the third embodiment, detailed description is omitted.

Therefore, the cathode member 360 is constructed in which the second portions 363b of the air vents 363 are extended from the first portions 363a and diameters of the second portions 363 gradually increase in a direction toward the second surface (B). In addition, the cathode member 360 includes the water discharge lines 365 for connecting the second portions 363b of the air vents 3663 with each other.

Accordingly, the surface tension of water condensed at the second portions 363b decreases, so that the water can be easily discharged outside the air vents 363 through the water discharge lines 365.

Since other components and operation of the direct oxidation fuel cell according to the embodiment are the same as those in the first embodiment, a detailed description is omitted.

Pursuant to the direct oxidation fuel cell according to the embodiments of the present invention, the cathode member maintains the contact area so that conductivity can be sustained, and is disposed in close contact with the MEA. In addition, the cathode member is constructed in which water condensed in the air vents can be easily discharged. Therefore, output efficiency of electrical energy is maintained, and the air vents of the cathode member can be prevented from being blocked by the water.

Accordingly, air in the atmosphere can be properly supplied through the air vents of the cathode member, efficiency and reliability of the entire fuel cell greatly increase.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, such modifications belong to the scope of the present invention.

What is claimed is:

1. A direct oxidation fuel cell comprising one or more electricity generators, each electricity generator having a membrane-electrode assembly and an anode member and a cathode member in close contact with respective sides of the membrane-electrode assembly, the membrane-electrode assembly being between the anode member and the cathode member to generate electrical energy and water by a reaction of a fuel and oxygen,
   wherein the cathode member comprises a plurality of air vents through which air flows and is exposed to the atmosphere, and
   wherein each of the air vents comprises:
      a first portion extending in a direction for a length from an area of the cathode member contacting the membrane-electrode assembly, the first portion having a substantially constant diameter along the length, and
      a second portion extending from an end of the first portion distal to the membrane-electrode assembly and having a diameter gradually increasing in the direction toward an area of the cathode member exposed to the atmosphere.

2. The direct oxidation fuel cell of claim 1, wherein the area of the cathode member exposed to the atmosphere is larger than the area of the cathode member closely contacting the membrane-electrode assembly.

3. The direct oxidation fuel cell of claim 1, wherein the cathode member comprises water discharge lines formed as grooves connecting the air vents at the area exposed to the atmosphere for discharging water condensed in the air vents.

4. The direct oxidation fuel cell of claim 3, wherein the water discharge lines comprise branch lines connected to the air vents and joining lines connected to the branch lines.

5. The direct oxidation fuel cell of claim 3, wherein the water discharge lines extend along a gravity direction.

6. The direct oxidation fuel cell of claim 3,
   wherein the water discharge lines connect the second portions with others of the second portions.

7. The direct oxidation fuel cell of claim 6, wherein the water discharge lines comprise branch lines connected to the second portions and joining lines connected to the branch lines.

8. The direct oxidation fuel cell of claim 1, wherein the anode member comprises a flowpath through which the fuel flows.

9. The direct oxidation fuel cell of claim 8, wherein the flowpath is a meandering flowpath.

10. The direct oxidation fuel cell of claim 1, wherein the anode member and the cathode member are constructed as current collectors for collecting currents having the opposite polarity to each other.

11. A direct oxidation fuel cell comprising one or more electricity generators, each electricity generator having an membrane-electrode assembly and an anode member and a cathode member in close contact with respective sides of the membrane-electrode assembly, the membrane-electrode assembly being between the anode member and the cathode member for generating electrical energy and water by a reaction of a fuel and oxygen, wherein the cathode member comprises a plurality of air vents through which air in the atmosphere flows and water discharge lines extending in a direction on an area of the cathode member exposed to the atmosphere for discharging water condensed in the air vents, the direction being substantially in parallel with at least one side of the respective sides of the membrane-electrode assembly, and wherein at least two columns of the air vents are coupled to a same one of the water discharge lines.

12. The direct oxidation fuel cell of claim 11, wherein the area of the cathode member exposed to the atmosphere is the same in size as a contacting area of a surface of the cathode member closely contacting the membrane-electrode assembly.

13. The direct oxidation fuel cell of claim 11, wherein the water discharge lines are grooves extending along a gravity direction and connect the air vents with others of the air vents.

14. The direct oxidation fuel cell of claim 11, wherein the water discharge lines comprise branch lines connected to the air vents and joining lines connected to the branch lines.

* * * * *

UNITED STATES PATENT AND TRADEMARK OFFICE
CERTIFICATE OF CORRECTION

PATENT NO. : 7,662,504 B2  
APPLICATION NO. : 11/605051  
DATED : February 16, 2010  
INVENTOR(S) : Ming-Zi Hong Page 1 of 1

It is certified that error appears in the above-identified patent and that said Letters Patent is hereby corrected as shown below:

On the Title Page

(56) References Cited Foreign Patent Documents

Insert -- European Search Report December 27, 2007 for International Application No. 06125029.6

Patent Abstract of Korea, Publication No. KR 2002-0057083, dated July 11, 2002, in the name of YONG JUN HWANG, et al --

In the Claims

Column 9, Claim 11, line 15

Delete "an" Insert -- a --

Signed and Sealed this  
Thirtieth Day of April, 2013

Teresa Stanek Rea  
*Acting Director of the United States Patent and Trademark Office*